(12) United States Patent
Kubo et al.

(10) Patent No.: US 8,525,936 B2
(45) Date of Patent: Sep. 3, 2013

(54) COMMUNICATION APPARATUS, TELEVISION RECEIVER, VIDEO SIGNAL PROCESSING APPARATUS, COMMUNICATION METHOD, PROGRAM, AND INTEGRATED CIRCUIT

(75) Inventors: Seiji Kubo, Osaka (JP); Taku Matsuda, Nara (JP); Yoshifumi Sakata, Osaka (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 13/146,480

(22) PCT Filed: Oct. 20, 2010

(86) PCT No.: PCT/JP2010/006216
§ 371 (c)(1),
(2), (4) Date: Jul. 27, 2011

(87) PCT Pub. No.: WO2011/145154
PCT Pub. Date: Nov. 24, 2011

(65) Prior Publication Data
US 2012/0013808 A1    Jan. 19, 2012

(30) Foreign Application Priority Data

May 18, 2010  (JP) .................................. 2010-114807

(51) Int. Cl.
| | |
|---|---|
| H04N 5/38 | (2006.01) |
| H04N 5/66 | (2006.01) |
| H04B 3/46 | (2006.01) |
| H04B 17/00 | (2006.01) |
| H04Q 1/20 | (2006.01) |
| H04J 7/00 | (2006.01) |
| H04J 3/16 | (2006.01) |
| H04J 3/22 | (2006.01) |
| G06F 15/16 | (2006.01) |

(52) U.S. Cl.
USPC ........... 348/723; 348/739; 375/225; 370/468; 370/213; 709/251

(58) Field of Classification Search
None
See application file for complete search history.

(56) References Cited

U.S. PATENT DOCUMENTS 5,436,555 A    7/1995  Locke et al.
5,610,903 A *  3/1997  Crayford ....................... 370/213

(Continued)

FOREIGN PATENT DOCUMENTS

JP    7-333270      12/1995
JP    2000-357079   12/2000

(Continued)

OTHER PUBLICATIONS

International Search Report issued Jan. 25, 2011 in corresponding International Application No. PCT/JP2010/006216.

*Primary Examiner* — Jefferey Harold
*Assistant Examiner* — Sean Haiem
(74) *Attorney, Agent, or Firm* — Wenderoth, Lind & Ponack, L.L.P.

(57) ABSTRACT

A communication apparatus (100) includes: a communication unit (10) connectable to one end of a cable (50); a first detection unit (111) which detects a maximum transmission capability of an external device based on a communication standard with which the external device complies, the external device being connected to an other end of the cable (50) connected to the communication unit (10); a second detection unit (112) which detects a maximum transmission capability of the cable (50) connected to the communication unit (10); and an alert output unit (114) which outputs an alert when the maximum transmission capability of the cable (50) is smaller than the maximum transmission capability of the external device, the maximum transmission capability of the cable having been detected by the second detection unit (112), and the maximum transmission capability of the external device having been detected by the first detection unit (111).

3 Claims, 6 Drawing Sheets

(56) References Cited

U.S. PATENT DOCUMENTS

| | | | |
|---|---|---|---|
| 2002/0133631 A1* | 9/2002 | Yun | 709/251 |
| 2007/0076243 A1 | 4/2007 | Janssen et al. | |
| 2009/0046638 A1* | 2/2009 | Rappaport et al. | 370/329 |
| 2009/0293027 A1 | 11/2009 | Yamazaki et al. | |
| 2009/0316722 A1* | 12/2009 | Traeber | 370/468 |
| 2010/0073574 A1* | 3/2010 | Nakajima et al. | 348/723 |

FOREIGN PATENT DOCUMENTS

| | | |
|---|---|---|
| JP | 2001-41991 | 2/2001 |
| JP | 2009-104473 | 5/2009 |
| JP | 2009-111800 | 5/2009 |
| WO | 2008/093401 | 8/2008 |

* cited by examiner

COMMUNICATION APPARATUS, TELEVISION RECEIVER, VIDEO SIGNAL PROCESSING APPARATUS, COMMUNICATION METHOD, PROGRAM, AND INTEGRATED CIRCUIT

TECHNICAL FIELD

The present invention relates to a communication apparatus which is connected to an external communication device via a cable, detects a problem caused by the cable, and notifies a user of the problem, and to a method thereof.

BACKGROUND ART

In recent years, communication apparatuses such as electric appliances connectable to a network have come into widespread use. An example of such communication apparatuses is a TV that allows easy viewing of multimedia information including an image such as an HDTV (high definition television) through the Internet at home or an office via a variety of distribution services.

In addition, a communication speed of the communication apparatuses connectable to the network is increasing every year, and a standard enabling a high-speed communication at 1000 Mbps is specified in addition to 10 Mbps and 100 Mbps. Likewise, cables to be connected to the communication devices are respectively specified for corresponding communication speeds.

On the other hand, many users do not have sufficient knowledge necessary for establishing a network environment, such as knowledge on a communication speed standard, a cable standard, and so on. In view of the above, it is expected to develop a communication apparatus with which even those users who do not have sufficient knowledge can easily recognize a problem in connecting to a network.

CITATION LIST

Patent Literature

[PTL 1]
Japanese Unexamined Patent Application Publication No. 2009-111800

SUMMARY OF INVENTION

Technical Problem

PTL 1 discloses a network connection device and a network connection notification method that enable even a user who does not have much technical knowledge to accurately obtain information necessary for connecting to a network, by notifying a result of connection to outside the device in both cases of succeeding and failing in connecting to a network.

However, PTL 1 has made no consideration as to the problem that, when devices corresponding to the communication speed of 1000 Mbps are connected to each other via a cable corresponding only up to the conventional communication speed of 100 Mbps (a LAN cable having only two pairs of core lines, for example), there is a case where linking cannot be established, or communication can be carried out but not at 1000 Mbps (in other words, linked at 100 Mbps). In other words, there is a problem that a user who does not have sufficient knowledge in a network cannot recognize at once a problem caused by a cable.

The present invention has been conceived in view of the above-described problems and aims to provide a communication apparatus that automatically detects an abnormal state caused by a cable and notifies a user of the state, thereby allowing the user to easily recognize the abnormal state.

Solution to Problem

A communication apparatus according to an aspect of the present invention is a communication apparatus comprising: a communication unit connectable to one end of a cable; a first detection unit configured to detect a maximum transmission capability of an external device based on a communication standard with which the external device complies, the external device being connected to an other end of the cable connected to the communication unit; a second detection unit configured to detect a maximum transmission capability of the cable connected to the communication unit; and an alert output unit configured to output an alert when the maximum transmission capability of the cable is smaller than the maximum transmission capability of the external device, the maximum transmission capability of the cable having been detected by the second detection unit, and the maximum transmission capability of the external device having been detected by the first detection unit.

With the configuration described above, it is possible to automatically detect an abnormal state caused by a cable and notify a user of the abnormal state, by automatically obtaining the maximum transmission capability of an external device and the maximum transmission capability of the cable and comparing the maximum transmission capabilities. As a result, the user can easily recognize the abnormal state. It is to be noted that the expression "the maximum transmission capability of the external device" typically refers, not to an actual transmission capability in which a processing capacity and the like of the external device are considered, but to a transmission capability specified by a communication standard with which a communication interface of the external device complies.

In addition, the first detection unit may separately determine whether or not the external device complies with communication standards, and detect, as the maximum transmission capability of the external device, a maximum value of a transmission capability from one or more transmission capabilities respectively specified, in one-to-one relationship, in one or more communication standards with which the external device complies.

As an example, the communication unit may include a register for storing information obtained from the external device, the information indicating the one or more communication standards, and the first detection unit may determine, by referring to the register, whether or not the external device complies with each of 10BASE-T, 100BASE-TX, and 1000BASE-T as the communication standards specified by IEEE802.3.

As an example, the communication unit may include terminals, the cable may include paired-cables corresponding to at least part of the terminals, and the second detection unit may transmit a pulse to each of the terminals of the communication unit and detect one of 100 Mbps and 1000 Mbps as the maximum transmission capability of the cable based on the number of the paired-cables obtained by analyzing a reflected wave of the pulse.

In addition, the communication apparatus may comprise a third detection unit configured to detect a data communication speed of data to be transmitted and received between the communication unit and the external device. Furthermore, the alert output unit outputs an alert when the maximum transmission capability of the cable is smaller than the maximum transmission capability of the external device and the maximum transmission capability of the cable falls below the data communication speed detected by the third detection unit, the maximum transmission capability of the cable having been detected by the second detection unit, and the maximum transmission capability of the external device having been detected by the first detection unit.

With the configuration described above, it is possible to suppress outputting an unnecessary alert, by notifying an alert to a user only when the communication speed actually required by an application exceeds the maximum transmission capability of the cable; that is, when a trouble actually occurs due to connection of an inappropriate cable. It is to be noted that the expression "the data communication speed of data to be transmitted and received between the communication apparatus and the external device" refers to a transmission speed required by an application which transmits the data and is different from an actual communication speed of the data to be transferred through a cable connecting the communication apparatus with the external device.

As an example, the third detection unit may detect the data communication speed based on the number of TCP (transmission control protocol) connections established with the external device. In addition, the data communication speed may be detected using the number of applications using a communication protocol such as UDP (user datagram protocol).

A television receiver according to an aspect of the present invention comprises: the communication apparatus described above, the communication apparatus receiving a video signal from the external device; and a display unit configured to display the video signal received by the communication apparatus.

A video signal processing apparatus according to an aspect of the present invention comprises: a signal processing unit configured to generate a video signal; and the communication apparatus described above, the communication apparatus transmitting the video signal generated by the signal processing unit to the external device.

A communication method according to an aspect of the present invention is a method performed by a communication apparatus to communicate with an external device, the communication apparatus including a communication unit connectable to one end of a cable, and the external device being connected to the other end of the cable. More specifically, the communication method comprising: detecting a maximum transmission capability of an external device based on a communication standard with which the external device complies, the external device being connected to an other end of the cable connected to the communication unit; detecting a maximum transmission capability of the cable connected to the communication unit; and outputting an alert when the maximum transmission capability of the cable is smaller than the maximum transmission capability of the external device, the maximum transmission capability of the cable having been detected in the detecting of a maximum transmission capability of the cable, and the maximum transmission capability of the external device having been detected in the detecting of a maximum transmission capability of an external device.

A non-transitory computer-readable recording medium for use in a computer according to an aspect of the present invention, the recording medium having a computer program recorded thereon for causing a communication apparatus including a communication unit connectable to one end of a cable to perform communication with an external device connected to the other end of the cable. More specifically, the program causes the communication apparatus to execute: detecting a maximum transmission capability of an external device based on a communication standard with which the external device complies, the external device being connected to an other end of the cable connected to the communication unit; detecting a maximum transmission capability of the cable connected to the communication unit; and outputting an alert when the maximum transmission capability of the cable is smaller than the maximum transmission capability of the external device, the maximum transmission capability of the cable having been detected in the detecting of a maximum transmission capability of the cable, and the maximum transmission capability of the external device having been detected in the detecting of a maximum transmission capability of an external device.

An integrated circuit according to an aspect of the present invention is mounted on a communication apparatus including a communication unit connectable to one end of a cable and performs communication with an external device connected to the other end of the cable. More specifically, the integrated circuit comprising: a first detection unit configured to detect a maximum transmission capability of an external device based on a communication standard with which the external device complies, the external device being connected to an other end of the cable connected to the communication unit; a second detection unit configured to detect a maximum transmission capability of the cable connected to the communication unit; and an alert output unit configured to output an alert when the maximum transmission capability of the cable is smaller than the maximum transmission capability of the external device, the maximum transmission capability of the cable having been detected by the second detection unit, and the maximum transmission capability of the external device having been detected by the first detection unit.

Advantageous Effects of Invention

According to the present invention, it is possible to automatically notify a user of an abnormal state caused by a cable, and thus the user can easily recognize the abnormal state.

DESCRIPTION OF EMBODIMENTS

The following describes specific embodiments according to the present invention with reference to the drawings.

[Embodiment 1]

Figure 1:
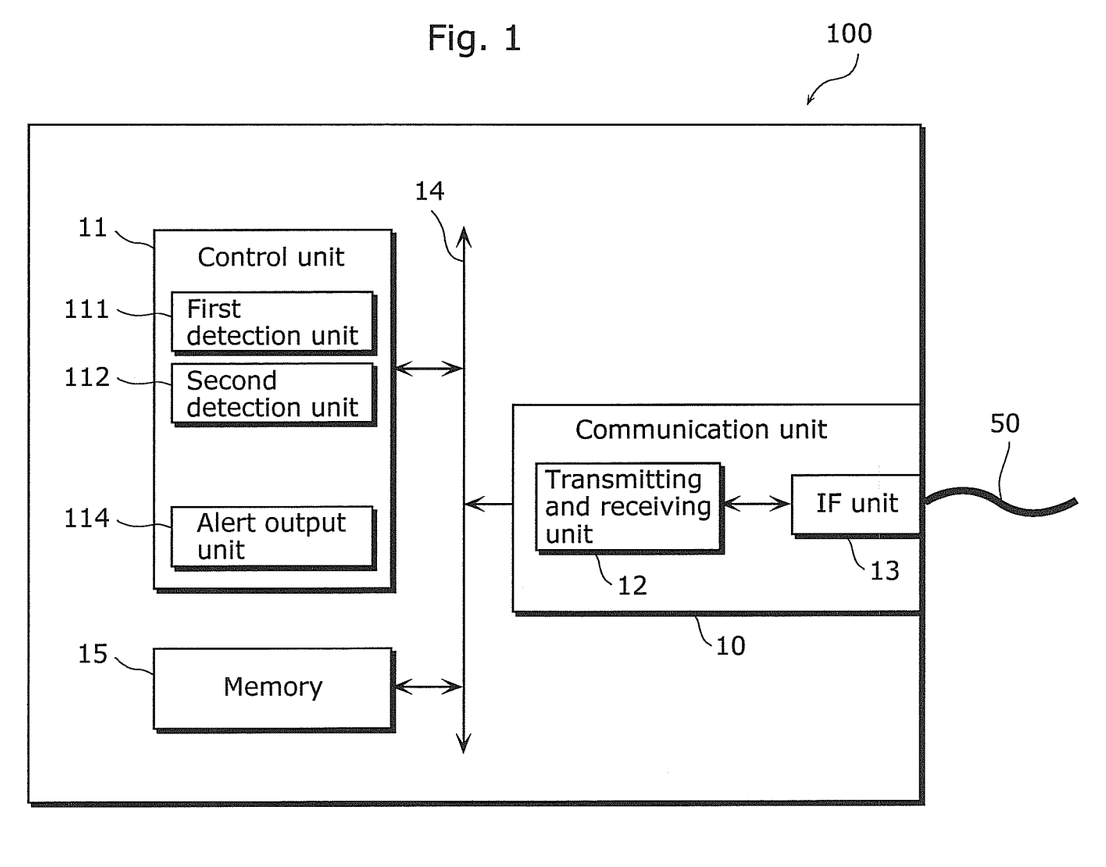
FIG. 1 is a block diagram which shows a communication apparatus according to Embodiment 1.

FIG. 1 is a block diagram which shows a communication apparatus 100 according to Embodiment 1. An outline of the communication apparatus 100 that performs communication with an external device (not illustrated) via a LAN cable 50 shall be given with reference to FIG. 1. In Embodiment 1, it is assumed that a wired LAN complying with IEEE802.3 standard is used. It is to be noted that the communication standard is not limited to the above-described standard but any standards may be used. For example, an HDMI (high-definition multimedia interface) cable complying with an HDMI standard may be used instead of the LAN cable 50.

The communication apparatus 100 according to Embodiment 1 of the present invention includes: a communication unit 10; a control unit 11; a general-purpose bus 14; and a memory 15. In addition, the communication unit 10 according to Embodiment 1 includes: a transmitting and receiving unit 12; and an IF (inter face) unit 13 for connecting to the LAN cable 50. Furthermore, the control unit 11 according to Embodiment 1 includes: a first detection unit 111; a second detection unit 112; and an alert output unit 114.

The first detection unit 111 detects a maximum transmission capability of an external device (not illustrated) connected via the LAN cable 50, based on a communication standard with which the external device complies. For example, the first detection unit 111 detects the communication standard of the external device (hereinafter simply referred to as "communication standard") to detect the maximum transmission capability specified in the communication standard. The communication standard corresponds to a communication speed complying with IEEE802.3 and includes, for example, 10Base-T with which communication can be carried out at 10 Mbps, 100Base-Tx with which communication can be carried out at 100 Mbps, 1000Base-T with which communication can be carried out at 1000 Mbps, and so on.

It is to be noted that, although a specific detection method is not limited to a particular method, the transmitting and receiving unit 12, for example, includes a PHY register (not illustrated) storing information necessary for communication with an external device and detects a communication standard from the information stored in the PHY register. The PHY register is a group of registers including registers identified by register addresses. It is to be noted that the transmitting and receiving unit 12 obtains information from the external device at the time when, for example, linking-up of a PHY level is established between the transmitting and receiving unit 12 and the external device and stores the information in the PHY register. In addition, the transmitting and receiving unit 12 may store, in the PHY register, information (information of Technology Ability Field, for example) obtained from FLP Burst that is transmitted and received when executing, for example, Auto-negotiation that is a function that automatically determines a difference of communication standards or communication modes to which communication devices correspond and performs communication with optimal settings.

The information stored in the PHY register includes at least information indicating a maximum transmission capability specified in IEEE802.3 of a partner device (corresponding to the external device described above) connected via the LAN cable 50. More specifically, the first detection unit 111 is capable of detecting the communication standard of the external device by referring to the PHY register included in the transmitting and receiving unit 12.

In general, the first detection unit 111 refers to a register (Link partner ability register) identified by a register address 5 among the PHY resisters, thereby determining whether or not the external device corresponds to 10Base-T and 100Base-TX. In addition, it is possible to determine whether or not the external device corresponds to 1000Base-T, by referring to a register (1000BASE-T registers) identified by a register address 10.

The first detection unit 111 separately determines whether or not the external device complies with each of the communication standards, using, for example, the above-described method. Then the first detection unit 111 detects, as the maximum transmission capability of the external device, a maximum value among transmission capabilities respectively specified in at least one communication standard with which the external device complies.

The second detection unit 112 detects the maximum transmission capability of the LAN cable 50 connected to the IF unit 13 of the communication apparatus 100. The maximum transmission capability of the LAN cable 50 is, for example, a communication speed of one of 10 Mbps, 100 Mbps, and 1000 Mbps.

As an example, a twisted paired-cable used in Ethernet® is categorized according to a utilization purpose, a maximum transmission speed, and the like. A cable capable of transmission at 100 Mbps, for example, is specified as a category 5 or higher, and carries out transmission using 2 Pairs 4 Cores cable. On the other hand, a cable capable of transmission at 1000 Mbps is specified as a category 5e or higher, and carries out transmission using 4 Pairs 8 Cores cable.

It is to be noted that, although a specific method of detecting the maximum transmission capability of the LAN cable 50 is not limited to a particular method, TDR (time domain reflectometry) and the like used for detecting an error in the LAN cable 50, such as an open, short, impedance mismatch, can be used. The TDR is a method that inputs a pulse into each paired-cable of a LAN cable and analyzes a reflected wave thereof.

Figure 5:
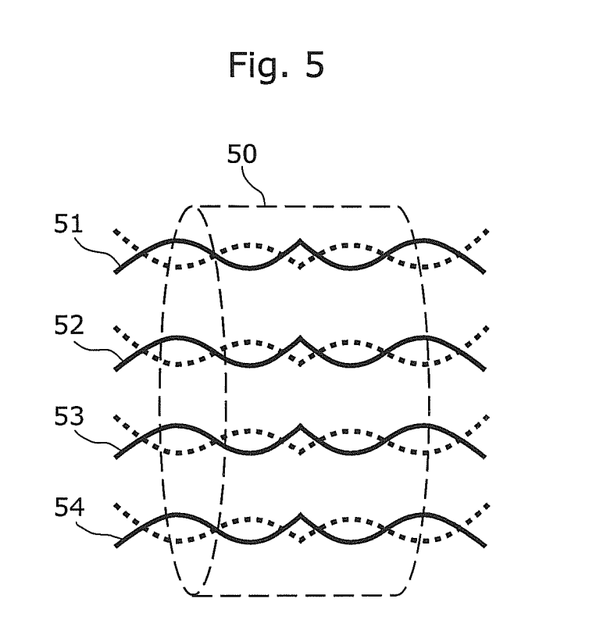
FIG. 5 is a schematic view which shows a LAN cable that is an example of a cable.

FIG. 5 is a schematic view which shows the LAN cable 50 of 4 Pairs 8 Cores, which includes: a paired-cable 51; a paired-cable 52; a paired-cable 53; and a paired-cable 54. The LAN cable 50 has one end connected to the IF unit 13 of the communication apparatus 100 and the other end connected to an external device, and transmits and receives data between the communication apparatus 100 and the external device.

Here, there is a case where the LAN cable 50 that complies with the category 5 that allows transmission at 100 Mbps includes two paired-cables 51 and 52 among four paired-cables 51, 52, 53, and 54, but does not include other two paired-cables 53 and 54. On the other hand, the LAN cable 50 that that complies with the category 5e or higher that allows transmission at 1000 Mbps includes all of the four paired-cables 51, 52, 53, and 54.

In addition, the IF unit 13 that accepts the LAN cable 50 is provided with terminals (not illustrated) corresponding to the 4 Pairs 8 Cores described above. Accordingly, the second detection unit 112 can detect whether or not there are the paired-cables 51, 52, 53, and 54 each of which is connected to a corresponding one of the terminals, by transmitting a pulse to each of the terminals of the IF unit 13 and detecting a reflected wave of the pulse.

More specifically, when a normal reflected wave can be detected from the terminals corresponding to two paired-cables 51 and 52 among four paired-cables 51, 52, 53, and 54, but a normal reflected wave cannot be detected from the terminals corresponding to the other two paired-cables 53 and 54 because they do not exist (analyzed as "open"), the second detection unit 112 can determine that the LAN cable 50 has a transmission capability up to 10 Mbps or 100 Mbps (in other words, 100 Mbps or lower) but does not have a transmission capability of 1000 Mbps. On the other hand, when a normal reflected wave is detected from all of the terminals respectively corresponding to the four paired-cables 51, 52, 53, and 54, the second detection unit 112 can determine that the LAN cable 50 has a transmission capability of 1000 Mbps or higher.

The alert output unit 114 outputs, to a user, an alert that indicates that the cable connected to the IF unit 13 is not appropriate, according to a control by the control unit 11. Whether or not to output an alert is determined based on the maximum transmission capability of the external device which is specified by the communication standard detected by the first detection unit 111 and the maximum transmission capability of the LAN cable 50 detected by the second detection unit 112 (the method of determination will be described below with reference to FIG. 2).

It is to be noted that the control unit 11 controls internal blocks of the control unit 11 and also controls operations of the communication apparatus 100 as a whole via the general-purpose bus 14. The control unit 11 can be implemented as a semiconductor element and the like. In addition, the control unit 11 may be configured only by hardware or may be implemented by combining hardware and software. The control unit 11 can be implemented as a microcomputer, for example.

The transmitting and receiving unit 12 relays communication between the communication apparatus 100 and the external device connected to the communication apparatus 100 via the LAN cable 50 connected to the IF unit 13. The transmitting and receiving unit 12 includes: a PHY (physical layer) complying with IEEE802.3 standard; an MAC (media access control) complying with IEEE802.3 standard; a PHY register that stores control information; and the like (not illustrated). It is to be noted that the transmitting and receiving unit 12 is not limited to the above-described configuration. For example, the MAC may be included in the control unit 11 and only the PHY may be included in the transmitting and receiving unit 12.

The IF unit 13 is a connection entrance for connecting the LAN cable 50 to be connected to the external device and transfers data (packet) between the transmitting and receiving unit 12 and the LAN cable 50. The IF unit 13, as described above, includes terminals each of which accepts a corresponding one of the paired-cables 51, 52, 53, and 54 of the LAN cable 50.

The general-purpose bus 14 interconnects the control unit 11, the transmitting and receiving unit 12, and the memory 15, and transmits and receives data between the elements. A specific example of the general-purpose bus 14, although not particularly limited, includes a PCI (peripheral component interconnect) bus, an MII (media independent interface) bus, and so on.

In addition, the memory 15 is used when storing data transmitted and received via the transmitting and receiving unit 12 and when the control unit 11 performs control. Any device, such as a DRAM (dynamic random access memory), a SDRAM (synchronous dynamic random access memory), a flash memory, a ferroelectric memory, and so on may be employed as the memory 15 as long as the media can record data.

Figure 2:
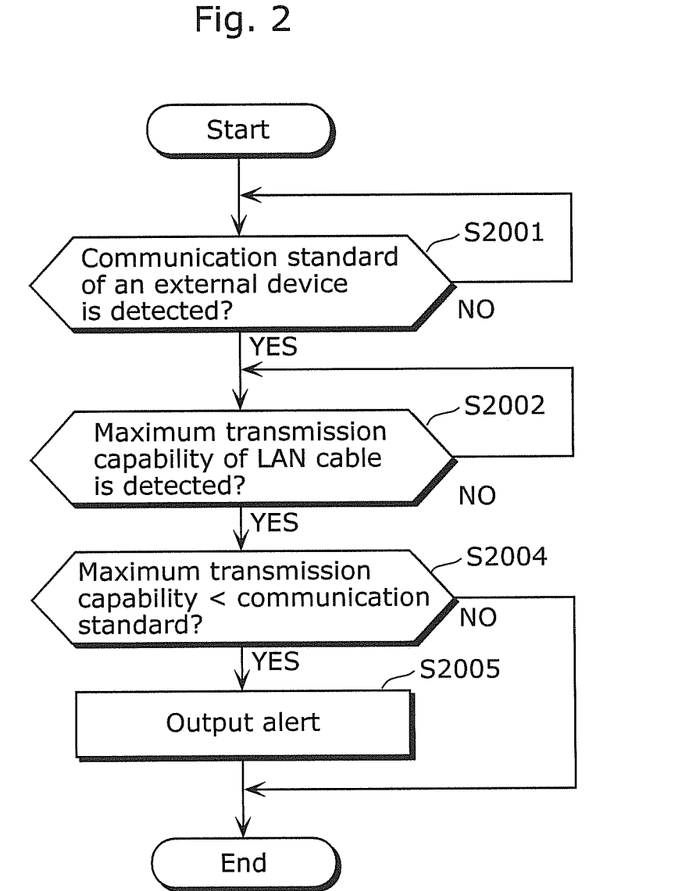
FIG. 2 is a flowchart which shows an example of operations performed by the communication apparatus according to Embodiment 1.

The following describes, with reference to FIG. 2, an example method of controlling output of an alert performed by the control unit 11 of the communication apparatus 100, using the maximum transmission capability of the external device detected by the first detection unit 111 and the maximum transmission capability of the LAN cable 50 detected by the second detection unit 112.

(Step S2001) First, the first detection unit 111 detects a communication standard of an external device. More specifically, the first detection unit 111 detects the communication standard of the external device by referring to information which is stored in the PHY register of the transmitting and receiving unit 12 and indicates the communication standard of the external device (YES in Step S2001), and the processing goes on to Step S2002. On the other hand, when the information indicating the communication standard of the external device is not yet stored in the PHY register and thus the communication standard of the external device cannot be detected (NO in Step S2001), the processing goes back to Step S2001 to continue monitoring of the PHY register It is to be noted that, when the processing goes back to Step S2001, it is also possible to wait for storage of the information indicating the communication standard of the external device into the PHY register, by waiting for reception of an interrupt signal which allows detection of storage of the information indicating the communication standard of the external device, and the like.

(Step S2002) Next, the second detection unit 112 detects the maximum transmission capability of the LAN cable 50. More specifically, the second detection unit 112 transmits a pulse to each of the terminals in the IF unit 13 and detects whether or not the paired-cables 51, 52, 53, and 54 shown in FIG. 5 are included, using a reflected wave of the pulse. Then, the second detection unit 112 detects the maximum transmission capability of the LAN cable 50 based on a result of analyzing the reflected wave (YES in Step S2002), and the processing goes on to Step S2004. On the other hand, when the maximum transmission capability cannot be detected (NO in Step S2002), the processing goes back to Step S2002 to continue detection processing.

(Step S2004) Next, the alert output unit 114 compares the maximum transmission capability of the external device which is specified by the communication standard detected by the first detection unit 111 with the maximum transmission capability of the LAN cable 50 detected by the second detection unit 112. Then, when the maximum transmission capability of the LAN cable 50 is lower than the maximum transmission capability of the external device (YES in Step S2004), the processing goes on to Step S2005, and when the maximum transmission capability of the LAN cable 50 is equal to or higher than the maximum transmission capability of the external device (NO in Step S2004), the processing is completed.

(Step S2005) Next, the alert output unit 114, according to the control by the control unit 11, outputs an alert that indicates that the LAN cable 50 connected to the IF unit 13 is not appropriate, and the processing is completed.

With the method described above, an alert is outputted in the case described below, for example. The external device connected via the LAN cable 50 corresponds to 1000BASE-T, as the communication standard. On the other hand, the LAN cable 50 includes only two of the paired-cables 51 and 52 out of the four paired-cables 51, 52, 53, and 54. Thus, the LAN cable 50 is a cable complying with the category 5 which allows transmission at up to 100 Mbps. In such a case, an alert that indicates that communication at 1000 Mbps is impossible with the current LAN cable 50.

In addition, the state of the LAN cable 50 having the maximum transmission capability of equal to or lower than 100 Mbps, for example, is not limited to the state described above. Such a state includes at least one of the paired-cables 53 and 54 which are not included in the above-described state is in an open or a short state. Furthermore, when the paired-cables 51 and 52 which are necessary for communication at 10 Mbps or 100 Mbps are abnormal in the first place, the transmission capability is less than 10 Mbps.

The configuration described above produces an advantageous effect of automatically detecting an abnormal state stemming from a cable and allowing the state to be notified. The abnormal state includes the case where communication at 1000 Mbps is impossible because the LAN cable 50 includes only two of the paired-cables 51 and 52 out of the four paired-cables 51, 52, 53, and 54. In addition, another advantageous effect is produced which allows a user to easily recognize an abnormal state stemming from a cable and a countermeasure against the abnormal state.

It is to be noted that, as a destination of the alert, a display, a speaker, an LED that indicates the alert, and so on, which are connected to the communication apparatus 100 according to an embodiment of the present invention can be considered, for example. In addition, it can also be considered to transmit an alert signal to a partner device or a device connected on a network which includes the display, the speaker, the LED that indicates the alert and to cause those devices to output a alert; however, destination of the alert is not limited to those described above.

As the content of an alert to be outputted, a request for changing a cable, a cause of the abnormal cable (a cause for disabling high speed communication or a cause for disabling connection and communication with a partner device), and the like can be considered; however, the content of an alert to be outputted is not limited to those described above.

It is to be noted that, execution timing for the processes shown in FIG. 2 is not particularly limited; however, it is typically sufficient to execute only once when a linking-up of a PHY level is established between the communication apparatus 100 and the external device. The reason for that is it is unrealistic that the communication standard of the external device or the maximum transmission capability of the LAN cable 50 changes in the state where the linking-up state is maintained between the communication apparatus 100 and the external device.

[Embodiment 2]

In Embodiment 1, the communication apparatus 100 is described with reference to FIG. 1 and FIG. 2, which detects the maximum transmission capability of the external device specified by the communication standard and the maximum transmission capability of the LAN cable 50 and controls output of an alert based on the detected information.

Figure 3:
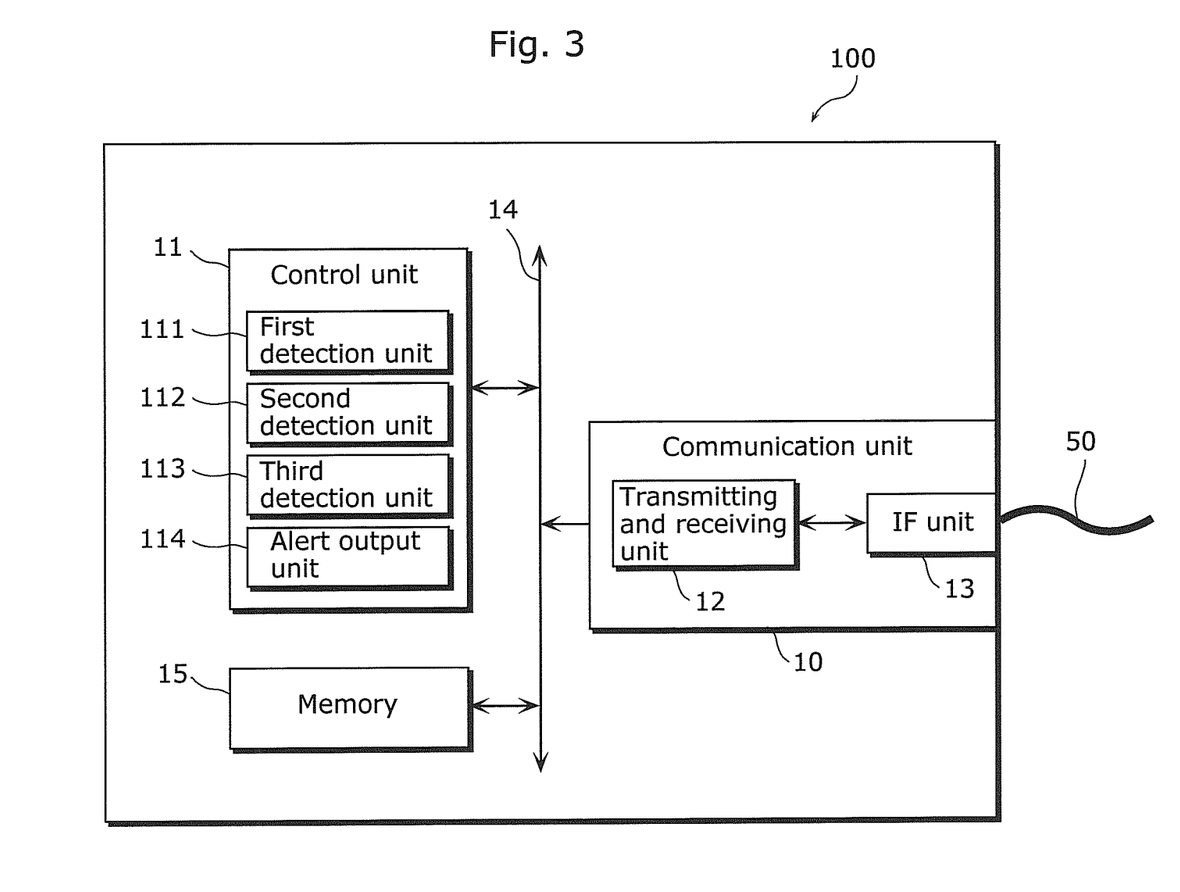
FIG. 3 is a block diagram which shows a communication apparatus according to Embodiment 2.
Figure 4:
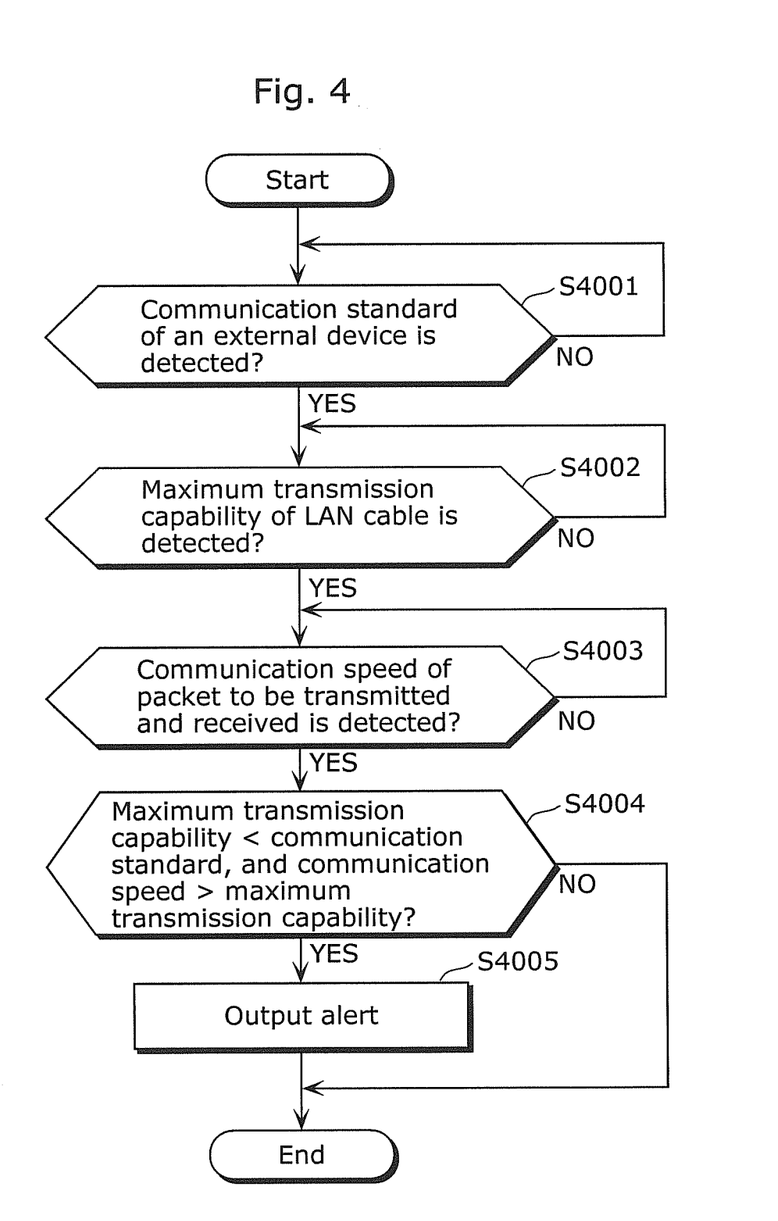
FIG. 4 is a flowchart which shows an example of operations performed by the communication apparatus according to Embodiment 2.

In Embodiment 2, the following describes, with reference to FIG. 3 and FIG. 4, a communication apparatus 100 that detects, in addition to the two items of detected information, a data communication speed of data (packet) to be transmitted and received between the communication apparatus 100 according to the present invention and an external device and controls output of an alert based on the three items of detected information.

The following describes, with reference to FIG. 3, the communication apparatus 100 according to Embodiment 2 of the present invention. The communication apparatus 100 according to Embodiment 2 of the present invention further includes a third detection unit 113 in the control unit 11 of the communication apparatus 100 described in Embodiment 1.

Descriptions for the elements of the communication apparatus 100 according to Embodiment 2 other than the third detection unit 113 and a specific operation performed by the alert output unit 114 that controls output of an alert, which is explained with reference to FIG. 4; that is, descriptions for the first detection unit 111 and the second detection unit 112 included in the control unit 11, the transmitting and receiving unit 12, the IF unit 13, the general-purpose bus 14, and the memory 15 are omitted because they are the same as those described in Embodiment 1 of the present invention.

The third detection unit 113 detects a data communication speed of data to be transmitted and received between the transmitting and receiving unit 12 and the external device. A specific method of detection is not limited; however, the number of connections for each application, a result of measuring a band with which transmission is actually tried, or the like is used for determination and detection. In the case of detection using the number of connections for each application, for example, since the transmission speed necessary for each application can be estimated in advance, it is possible to determine the data communication speed using a sum of the transmission speed (Mbps) of each of the applications.

As a specific example, when three applications 1, 2, and 3 each of which requires a transmission speed of 40 Mbps and transmits data to the external device (or receives data from the external device) are executed in the control unit 11 of the communication apparatus 100, the third detection unit 113 detects that the data communication speed is 120 Mbps in the case where a connection is established between each of the applications 1, 2, and 3 and the external device. In addition, the third detection unit 113 detects that the data communication speed is 150 Mbps in the case where an application 4 is added which requires the transmission speed of 30 Mbps As the data communication speed for each connection, the maximum speed, the average speed, or the like during connection lifetime is naturally considered; however, the data communication speed is not limited to those speeds, and any information may be used as long as the information can be used for determining whether or not there is a higher transmission capability than the maximum transmission capability detected by the second detection unit 112.

The following describes, with reference to FIG. 4, an example of a method of controlling output of an alert, performed by the alert output unit 114, using information of: the communication standard of the external device which is detected by the first detection unit 111; the maximum transmission capability of the LAN cable 50 which is detect by the second detection unit 112; and the data communication speed which is detected by the third detection unit 113.

(Step S4001) First, the first detection unit 111 detects a communication standard of the external device (YES in Step S4001), and the processing goes on to Step S4002. On the other hand, when the communication standard is not detected (NO in Step S4001), the processing goes back to Step S4001 and monitoring is continued.

(Step S4002) Next, the second detection unit 112 detects the maximum transmission capability of the LAN cable 50 (YES in Step S4002), and the processing goes on to Step S4003. On the other hand, when the maximum transmission capability is not detected (NO in Step S4002), the processing goes back to Step S4002 and monitoring is continued.

It is to be noted that Step S4001 and Step S4002 described above are executed at the time when, for example, linking-up at a PHY level is established between the communication apparatus 100 and the external device. However, only the information is obtained at this time and determination processing that corresponds to Step S2004 in FIG. 2 is not carried out, which is different from Embodiment 1.

(Step S4003) Next, the third detection unit 113 detects the data communication speed of data to be transmitted and received between the communication apparatus 100 and the external device (YES in Step S4003), and the processing goes on to Step S4004. On the other hand, when the data communication speed is not detected (NO in Step S4003), the processing goes back to Step S4003 and monitoring is continued.

(Step S4004) Next, the alert output unit 114 compares the maximum transmission capability of the external device which is specified by the communication standard detected by the first detection unit 111, the maximum transmission capability of the LAN cable 50 detected by the second detection unit 112, and the data communication speed detected by the third detection unit 113, to determine whether or not to output an alert. When conditions that the maximum transmission capability of the LAN cable 50 is (i) smaller than the maximum transmission capability of the external device which is specified by the communication standard and (ii) lower the data communication speed, as determination conditions, are satisfied (YES is Step S4004), the processing goes on to Step S4005. On the other hand, when the determination conditions are not satisfied (NO in Step S4004), the processing is completed.

(Step S4005) Next, the alert output unit 114, according to the control by the control unit 11, outputs an alert that indicates that the LAN cable 50 connected to the IF unit 13 is not appropriate, and the processing is completed.

With the method described above, an alert is outputted in the case described below, for example. The external device connected via the LAN cable 50 corresponds to 1000BASE-T, as the communication standard. On the other hand, the LAN cable 50 includes only two of the paired-cables 51 and 52 out of the four paired-cables 51, 52, 53, and 54. Thus, the LAN cable 50 complies with the category 5 which is capable of transmission at 100 Mbps or lower. When the communication apparatus 100 according to the present invention attempts communication with the external device at a communication speed higher than 100 Mbps, an alert is outputted because the current LAN cable 50 is not capable of communication at the communication speed higher than 100 Mbps.

With the configuration described above, when liking at 100 Mbps (when communication at 1000 Mbps cannot be carried out) because the communication apparatus 100 and the external device are connected using the LAN cable 50 having only two paired-cables 51 and 52 out of four paired-cables 51, 52, 53, and 54, for example, an alert is notified in the case where an application requires a communication speed higher than 100 Mbps and not notified in the case where the application does not require the communication speed higher than 100 Mbps. Accordingly, an advantageous effect is produced which allows a user to easily recognize an abnormal state only when the user is in a circumstance which requires detecting abnormality (when a trouble occurs). This naturally produces another advantageous effect as well which prevents an alert notification from interrupting viewing in the case of viewing a video which has been communicated, on TV or the like.

In addition, as also described in Embodiment 1 according to the present invention, the state of the LAN cable 50 is not limited to the above-described state. The state in which the maximum transmission capability is equal to or lower than 100 Mbps includes, for example, the case in which at least one of the paired-cables 53 and 54 which are not included in the above-described state is in an open or a short state. Furthermore, when the paired-cables 51 and 52 which are necessary for communication at 10 Mbps or 100 Mbps are abnormal in the first place, the transmission capability is less than 10 Mbps.

It is to be noted that, in the processing of FIG. 4, when the determination conditions are not satisfied in Step S4004 (NO in Step S4004), the processing may go back to Step S4003. It is not likely that the detected information of the communication standard changes, unless the settings of the external device are changed or the external device itself is changed. Likewise, it is not likely that the detected information of the maximum transmission capability of the LAN cable 50 changes, unless the LAN cable 50 is changed.

On the other hand, since it is likely that the data communication speed changes frequently according to a status of use of the communication apparatus 100 or the external device, the processing is expected to change as described above. With the change described above, since it is possible to omit repeatedly executing the processes of Step S4001 and Step S4002, yet another advantageous effect is produced which allows reduction in a processing load of the control unit 11.

In addition, two conditions are determined in Step S4004 according to the processing of FIG. 4; however, these conditions may be determined with different timings. To be specific, at the time when linking-up at a PHY level is established between the communication apparatus 100 and the external device, the communication standard of the external device is detected (Step S4001), the maximum transmission capability of the LAN cable 50 is detected (Step S4002), and the maximum transmission capability of the external device specified by the communication standard and the maximum transmission capability of the LAN cable 50 is compared (corresponding to Step S2004 in FIG. 2).

Then, only when the maximum transmission capability of the LAN cable 50 is smaller than the maximum transmission capability of the external device specified by the communication standard, subsequent processes (Step S4003 to Step S4005) are executed. On the other hand, when the maximum transmission capability of the LAN cable 50 is equal to or higher than the maximum transmission capability of the external device specified by the communication standard, subsequent processes (Step S4003 to Step S4005) are not executed. This makes it possible to reduce the processing load of unnecessary processing of the control unit 11.

It is to be noted that, as also described in Embodiment 1 of the present invention, a display, a speaker, an LED that indicates the alert, and so on, which are connected to the communication apparatus 100 according to an embodiment of the present invention can be considered as a destination of the alert, for example. In addition, it can also be considered to transmit an alert signal to a partner device or a device connected on a network which includes the display, the speaker, the LED that indicates the alert; however, destination of the alert is not limited to those described above.

As the content of an alert to be outputted, a request for changing a cable, a cause of the abnormal cable (a cause for disabling high speed communication or a cause for disabling connection and communication with a partner device), and the like can be considered; however, the content of an alert to be outputted is not limited to those described above.

Figure 6:
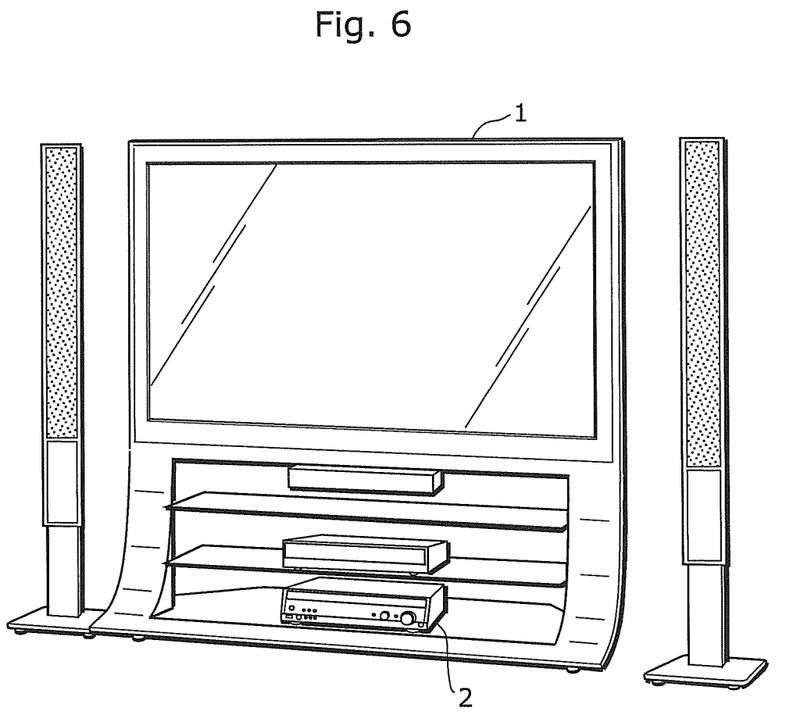
FIG. 6 is an external view which shows a television receiver and a video signal processing apparatus according to an aspect of the present invention.

The following describes, with reference to FIG. 6, an example of an apparatus on which the communication apparatus 100 described above is mounted. FIG. 6 is an external view which shows a television receiver 1 and a BD (Blu-ray disc) player 2 according to an aspect of the present invention.

The television receiver 1 includes: the communication apparatus 100 which receives a video signal from an external device; and a display unit which displays the video signal received by the communication apparatus 100, for example. In addition, the BD player 2 includes: a signal processing unit which generates a video signal by, for example, decoding a signal read from a BD; and a communication apparatus which transmits the video signal generated by the signal processing unit.

Then, one end of a cable is connected to the IF unit 13 in the communication apparatus 100 of the television receiver 1 and the other end of the cable is connected to the IF unit 13 in the communication apparatus 100 of the BD player 2. Video signals and the like are transmitted and received via the cable. Accordingly, the BD player 2 corresponds to the external device when viewed from the television receiver 1 and the television receiver 1 corresponds to the external device when viewed from the BD player 2.

However, the apparatus on which the communication apparatus 100 is mounted is not limited to the above. For example, the communication apparatus 100 may be mounted on other video signal processing apparatus such as a DVD (digital versatile disc) player, an HDD (hard disk drive) player, a set-top box, and so on, instead of the BD player 2. Furthermore, the apparatus on which the communication apparatus 100 is mounted is not limited to an apparatus that transmits and receives video signals, as those described above, and the communication apparatus 100 may be mounted on PC (personal computer) or the like.

[Other Embodiments]

It is to be noted that the communication apparatus 100 according to Embodiments 1 and 2 is not limited to the above-described configuration and method.

For example, in a series of processes to output an alert using detected information described with reference to FIG. 2, Step S2001 and Step S2002 may be replaced with each other in execution order; that is, Step S2001 may be executed after Step S2002 is executed.

In addition, when the communication standard detected in Step S2001 is not equal to or higher than a predetermined standard, processes subsequent to Step S2001 (Steps S2002, S2004, and S2005) may be omitted, and Steps S2002, S2004, and S2005 may be performed only when the communication standard is equal to or higher than the predetermined standard.

As an example of the above-described omitting of the processes, the following can be considered: when the communication apparatus 100 is directed to alert that communication at 1000 Mbps is impossible because the LAN cable 50 having only two paired-cables 51 and 52 is used in spite of the fact that the external device corresponds to 1000 Mbps, whether or not the external device corresponds to 1000 Mbps is determined as the determination of the above-described predetermined standard.

Likewise, in a series of processes to output an alert using detected information described with reference to FIG. 4, Step S4001, Step S4002, and Step S4003 may be replaced with each other in execution order, for example.

In addition, when the communication standard detected in Step S4001 is not equal to or higher than a predetermined standard, processes subsequent to Step S4001 (Steps S4002, S4003, S4004, and S4005) may be omitted, and Steps S4002, S4003, S4004, and S4005 may be performed only when the communication standard is equal to or higher than the predetermined standard.

As an example of the above-described omitting of the processes, the following can be considered: when the communication apparatus 100 is directed to alert that communication at 1000 Mbps is impossible because the LAN cable 50 having only two paired-cables 51 and 52 is used in spite of the fact that the external device corresponds to 1000 Mbps, whether or not the external device corresponds to 1000 Mbps is determined as the determination of the above-described predetermined standard.

From the same viewpoint, the following method may be considered: Step S4003 is first executed and, when the communication speed is equal to or lower than 100 Mbps, Steps S4001, S4002, S4004, and S4005 are omitted. An advantageous effect of reducing the processing load of the control unit 11 can be produced by omitting the steps as described above.

The communication apparatus 100 according to the present invention is explained with reference to Embodiments 1 and 2; however, the embodiments of the present invention are not limited to those described above. More specifically, it is only necessary that (i) the communication standard of an external device connected via a wired cable is detected, (ii) the maximum transmission capability of the wired cable connected to a communication apparatus is detected, and (ii) an output of an alert can be controlled based on the result of comparing the items of the detected information.

The present invention has been described based on the embodiments described above; however, it should be understood that the present invention is not limited to the embodiments described above. The present invention also includes the cases below.

The communication apparatus 100 described above is, specifically, a computer system including a microprocessor, a ROM, a RAM, a hard disk unit, a display unit, a keyboard, a mouse, and so on. A computer program is stored in the RAM or hard disk unit. The communication apparatus 100 achieves its function shown in FIG. 2 or FIG. 4, through the microprocessor's operation according to the computer program. Here, the computer program is, in order to achieve predetermined functions, configured by combining plural instruction codes indicating instructions for the computer.

A part or all of the constituent elements constituting the communication apparatus 100 may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the ROM. The System-LSI achieves its function through the microprocessor's operation according to the computer program.

A part or all of the constituent elements constituting the communication apparatus 100 described above may be configured as an IC card which can be attached and detached from the communication apparatus 100 or as a stand-alone module. The IC card or the module is a computer system configured from a microprocessor, a ROM, a RAM, and so on. The IC card or the module may also be included in the aforementioned super-multi-function LSI. The IC card or the module achieves its function shown in FIG. 2 or FIG. 4, through the microprocessor's operation according to the computer program. The IC card or the module may also be implemented to be tamper-resistant.

The present invention may be a method shown in FIG. 2 or FIG. 4. In addition, the present invention may be a computer program for realizing these methods, using a computer, and may also be a digital signal representing the computer program.

Furthermore, the present invention may also be realized by storing the digital signal that represents the computer program in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the digital signal that represents the program by recording onto the aforementioned recording media, or by transferring the digital signal that represents the program via the aforementioned network and the like, execution using another independent cable computer system is also made possible.

Each of the above-mentioned embodiments and modification examples may be applied to each other.

It is to be noted that, although the embodiments according to the present invention have been described with reference to diagrams, the present invention is not limited to the above-mentioned embodiments. Various changes and modifications may be applied to the embodiments as shown above, unless such changes and modifications depart from the same or equivalent scope of the present invention.

[Industrial Applicability]

The present invention is used, in particular, for electric appliances connectable to a network, which are used by a user who does not have knowledge sufficient for establishing a network environment. However, the present invention is also applicable to general communication devices which perform communication with an external device via a cable.

[Reference Signs List]
1 television receiver
2 BD player
10 communication unit
11 control unit
12 transmitting and receiving unit
13 IF unit
14 general-purpose bus
15 memory
50 LAN cable
51, 52, 53, 54 paired-cable
100 communication apparatus
111 first detection unit
112 second detection unit
113 third detection unit
114 alert output unit

The invention claimed is:

1. A communication apparatus comprising:
a communication unit having a cable connector to which one end of a cable is connected;
a first detection unit configured to detect a maximum communication capability of an external device based on a communication standard with which the external device complies, the external device being connected to another end of the cable connected to said cable connector;
a second detection unit configured to detect a maximum transmission capability of the cable connected to said cable connector; and
an alert output unit configured to output an alert when the maximum transmission capability of the cable is smaller than the maximum communication capability of the external device, the maximum transmission capability of the cable having been detected by said second detection unit, and the maximum communication capability of the external device having been detected by said first detection unit,
wherein said first detection unit is configured to separately determine whether or not the external device complies with communication standards, and detect, as the maximum communication capability of the external device, a maximum value of a communication capability from one or more communication capabilities respectively specified, in one-to-one relationship, in one or more communication standards with which the external device complies,
wherein said communication unit includes a register for storing information obtained from the external device, the information indicating the one or more communication standards,
wherein said first detection unit is configured to determine, by referring to said register, whether or not the external device complies with each of 10BASE-T, 100BASE-TX, and 1000BASE-T as the communication standards specified by IEEE802.3,
wherein said communication apparatus further comprises a third detection unit configured to detect a data communication speed of data to be transmitted and received between said communication unit and the external device,
wherein said alert output unit is configured to output an alert when the maximum transmission capability of the cable is smaller than the maximum communication capability of the external device and the maximum transmission capability of the cable falls below the data communication speed detected by said third detection unit, the maximum transmission capability of the cable having been detected by said second detection unit, and the maximum communication capability of the external device having been detected by said first detection unit, and
wherein said communication apparatus receives a video signal from the external device, and said communication apparatus is included in a television receiver, the television receiver including a display unit configured to display the video signal received by said communication apparatus.

2. The communication apparatus according to claim 1, wherein said cable connector includes terminals, wherein the cable includes paired-cables corresponding to at least part of said terminals, and
wherein said second detection unit is configured to transmit a pulse to each of said terminals of said cable connector and to detect one of 100 Mbps and 1000 Mbps as the maximum transmission capability of the cable based on the number of the paired-cables obtained by analyzing a reflected wave of the pulse.

3. The communication apparatus according to claim 1, wherein said third detection unit is configured to detect the data communication speed based on the number of TCP (transmission control protocol) connections established with the external device.

* * * * *